United States Patent
Greenert et al.

(10) Patent No.: US 6,779,825 B1
(45) Date of Patent: Aug. 24, 2004

(54) TWO-PIECE TAILGATE APPARATUS OPERABLE AS EITHER A DUAL ROTATABLE OR PIVOTABLE GATE

(75) Inventors: Clarence H. Greenert, Greenville, PA (US); Milton T. Graham, Hadley, PA (US); Matthew L. Graham, Meadville, PA (US)

(73) Assignee: Bucks Fabricating, division of Deist Industries, Inc., Hadley, PA (US)

(*) Notice: Subject to any disclaimer, the term of this patent is extended or adjusted under 35 U.S.C. 154(b) by 0 days.

(21) Appl. No.: 10/309,354

(22) Filed: Nov. 18, 2002

(51) Int. Cl.$^7$ ................................. B62D 25/00
(52) U.S. Cl. ................ 296/51; 296/50; 296/57.1
(58) Field of Search .................. 296/51, 56, 57.1, 296/37.6, 184, 146.6, 183, 146.5, 50, 146.8; 298/23 M, 23 MD, 23 R, 1 R, 235; 292/DIG. 29; 414/519; 239/657, 676; 166/106; 16/230

(56) References Cited

U.S. PATENT DOCUMENTS

| | | | | |
|---|---|---|---|---|
| 1,583,756 A | * | 5/1926 | Stiftner ................ | 166/106 |
| 2,195,991 A | * | 4/1940 | Lovett ................. | 16/230 |
| 3,027,188 A | * | 3/1962 | Eichstadt ............. | 296/51 |
| 3,387,406 A | * | 6/1968 | Coker et al. ......... | 296/50 |
| 3,544,153 A | * | 12/1970 | Galbreath et al. ... | 296/51 |
| 3,592,504 A | * | 7/1971 | Sandor ................ | 296/57.1 |
| 3,623,764 A | * | 11/1971 | Jacobus ............... | 296/50 |
| 3,656,800 A | * | 4/1972 | Timmons et al. ..... | 296/50 |
| 3,785,695 A | * | 1/1974 | Conkle ................ | 296/50 |
| 4,059,307 A | * | 11/1977 | Neufeldt ............. | 298/23 R |
| 4,076,301 A | * | 2/1978 | Gergoe ................ | 296/50 |
| 4,143,904 A | * | 3/1979 | Cooper et al. ....... | 296/57.1 |
| 4,691,956 A | * | 9/1987 | Hodge ................. | 296/51 |
| 5,524,954 A | * | 6/1996 | Gold ................... | 296/56 |
| 5,685,594 A | * | 11/1997 | Harper ................ | 296/51 |
| 6,015,191 A | * | 1/2000 | Bontrager ............ | 298/23 D |
| 6,131,989 A | * | 10/2000 | Montone et al. ..... | 296/51 |
| 6,135,565 A | * | 10/2000 | Bachelor ............. | 298/23 M |
| 6,217,123 B1 | * | 4/2001 | Palmberg, Jr. ....... | 296/51 |
| 6,361,266 B1 | * | 3/2002 | Hagemeyer et al. .. | 414/519 |
| 6,364,391 B1 | * | 4/2002 | Everett ............... | 296/51 |
| 6,412,877 B1 | * | 7/2002 | Faison ................ | 296/51 |
| 6,550,838 B2 | * | 4/2003 | Bobbitt et al. ...... | 296/57.1 |
| 6,550,839 B2 | * | 4/2003 | Rogers et al. ....... | 296/56 |
| 2003/0122396 A1 | * | 7/2003 | Humphrey et al. ... | 296/51 |

* cited by examiner

*Primary Examiner*—Kiran Patel
(74) *Attorney, Agent, or Firm*—Quinn Law Firm (57) ABSTRACT

A tailgate apparatus on vehicle bodies mounted so that the tailgate opens by pivoting about a horizontal axis or rotates about either one or both of the outer vertical axes as desired for unloading of the content of the vehicle body or container. The tailgate may be split and hinged in barn door fashion or it may be one-piece and hinged on a single side, while simultaneously hinged in dump fashion at the top. The hardware design of the apparatus allows dual rotatable opening of the tailgate or overhead dump opening of the tailgate.

7 Claims, 7 Drawing Sheets

TWO-PIECE TAILGATE APPARATUS OPERABLE AS EITHER A DUAL ROTATABLE OR PIVOTABLE GATE

BACKGROUND OF THE INVENTION

The present invention relates to tailgate or end-gate devices implemented on transport-type vehicles used in material handling industries and businesses, such as hauling, shipping, construction, excavation, refuse, storage, maintenance, and light industrial and commercial applications. More particularly, this invention relates to pivotable "dump-style" tailgates, and split tailgates that are dually rotatable.

Generally, transport vehicles used for material handling are equipped with tailgates designed to fulfill one function; often these tailgates take one of two forms. The first type is a dump-style tailgate that pivots about a horizontal axis at the top of the tailgate while latching at the bottom during transit. The second design has a side hinge and rotates about a vertical axis in barn door fashion; this type of tailgate has been created using both a single door or split door construction.

Dump-style tailgates (those that pivot about a horizontal axis at the top) are usually designed for vehicle beds that can be raised in the front causing the material contained to shift to the rear of the bed where it is dumped through the tailgate. Although this tailgate design provides an expedient way to unload material with relatively little manpower, the dump-style tailgate does not provide easy access to the vehicle bed. As a result, situations requiring material to be loaded and unloaded by hand or calling for any other accessibility to the vehicle bed would be complicated by a dump-style tailgate design.

In such cases, a side-hinge tailgate (one that rotates about a vertical axis on the side of the tailgate) provides more accessibility to the vehicle bed. A one-piece door construction is hinged on a vertical axis at an end of the tailgate allowing a single tailgate door to open to one side. Though the tailgate door permits ready access to the vehicle's bed, it can be problematic where the vehicle faces space constraints. For example, a vehicle loading or unloading in a confined space, such as a tight alleyway or between trees, may not have adequate room for the tailgate door to fully open where its width is equal to that of the vehicle bed itself. Thus, in tight spaces such a tailgate would be useless. An alternate side-hinge tailgate has been developed to combat space constraints in which the door is split and hinged on both vertical ends of the tailgate so that each door panel dually rotates about a vertical axis. By splitting the tailgate door, only a portion of the entire bed width is needed to open the door, thereby minimizing the inability to load and unload in narrow spaces.

In each of these constructions, however, the user is still limited to either the dump-style or side-hinge door-style tailgate and the limitations of each design's use. Very few tailgates have been designed which permit the user to alternate between use of the same tailgate as either dump or side-hinge style. However, those tailgates that have been designed to operate as both dump and side-hinge style pose several drawbacks. For example, these dual-purpose tailgates ordinarily employ the one-piece side-hinge style door, creating difficulties in confined spaces as mentioned above. Additionally, the operator's safety is compromised where the operator must disengage the door latch to use the dump-style gate at the rear of the vehicle. Present split-door style tailgates often position the door latch in the center of the tailgate forcing the operator to stand directly in front of the vehicle bed. If material shifts during transport, the operator could suffer serious injuries by opening the centrally located door latch because he will be standing directly in front of the load when it falls from the vehicle bed.

Bontrager has developed one type of dually operable tailgate disclosed in U.S. Pat. No. 6,015,191. The Bontrager invention uses a type of dump-style tailgate, but also permits the operator to use the tailgate as a side-hinge gate. The side-hinge gate on the Bontrager invention can be built as either a one-piece or split tailgate; however, the split gate has only one centrally located door latch which appears to require the operator to manually open the latch while standing directly behind the tailgate doors. If materials in the vehicle bed shifted during transport, the operator's safety could be jeopardized if material fell from the vehicle bed when she opened the central door latch. Additionally, the Bontrager apparatus does not indicate any specialized construction to insure the split door configuration retains its rigidity and alignment while the door is used as a dump-style tailgate. Again, such rigidity and alignment is important for safety reasons. If the tailgate fails to maintain its rigid structure and alignment, it could collapse during transport or while unloading material, resulting not only in loss of the load, but potentially causing personal injury to operators and bystanders.

OBJECTS & ADVANTAGES

Accordingly, several objects and advantages of the present Patent Application of Bucks Fabricating, a division of Deist Industries, Inc. for "Tailgate Apparatus Operable as Either a Split Rotatable or Pivotable Gate" are:

1. To provide a tailgate apparatus for transport-type vehicles useable as either a dump-style (hinged along the top of the tailgate and pivotable on a horizontal axis), or as a split side-hinge tailgate (hinged at each side of the tailgate and dually rotatable along a vertical axis).
2. To provide a more reliable dual purpose tailgate by aligning the side-hinge doors more tightly to increase the rigidity of the structure, thus preventing buckling of the doors.
3. To provide a more convenient tailgate apparatus for operations requiring dump-style applications while also needing ready access to the vehicle bed.
4. To provide a tailgate apparatus designed for use in spaces where a split side-hinge door construction requires less space to access the vehicle bed.
5. To provide a dual purpose tailgate that affords greater safety protections to the operator and to any bystanders where:
   (a) The dump gate latch is released at the front of the vehicle bed preventing material from spilling onto the operator.
   (b) The split side-hinge door latches are disengaged by a release handle located on the side of the door opening preventing material from spilling onto the operator.
   (c) The split door alignment is designed for greater rigidity to prevent buckling of the doors during transit or operation.
6. To provide a dual-purpose tailgate that is simpler to operate where it uses a forward release latch system and fewer pins are needed in interchanging between door uses.

SUMMARY

In accordance with the present invention a two-piece tailgate apparatus operable as either a rotatable or pivotable gate comprises both a rotatable and pivotable mount enabling the tailgate to rotate about either horizontal or vertical axes so that the tailgate door panel(s) open on one or both ends, or alternatively along the top. The tailgate apparatus encompasses safety features allowing the operator to open the door panel(s) without being directly in front of the cargo area. Additionally, the door panel(s) are designed to use angular locking and positioning mechanisms to create a more rigid tailgate structure that prevents buckling and collapsing of the door panel(s) during operation.

DRAWINGS—FIGURES

In the drawings, closely related figures have the same number but different alphabetic suffixes.

| DRAWINGS - REFERENCE NUMERALS | | | |
|---|---|---|---|
| 6 | dump-swing hinge bracket | 7 | upper door hinge |
| 8 | door hinge pin | 9 | lower door hinge |
| 10 | dump latch | 11 | dump latch bar |
| 12 | safety chains | 14 | alignment locks |
| 16 | latch loop | 18 | cam lock |
| 20 | positioning fork | 22 | bushing |
| 24 | extension bar | 25 | cam actuator |
| 26 | ratchet binder | 28 | pivot bar |
| 30 | positioning bracket | 32 | door chain |
| 34 | door panel | 36 | vehicle bed |
| 38 | dump latch safety release | 40 | chain fastener |
| 42 | dump latch release safety chain | 44 | vehicle bed side wall |
| 46 | front vehicle bed | 48 | door hinge pin holder |
| 49 | rear vehicle bed | | |

DETAILED DESCRIPTION

FIGS. 1A to 1D—The Preferred Embodiment

Figure 1A:
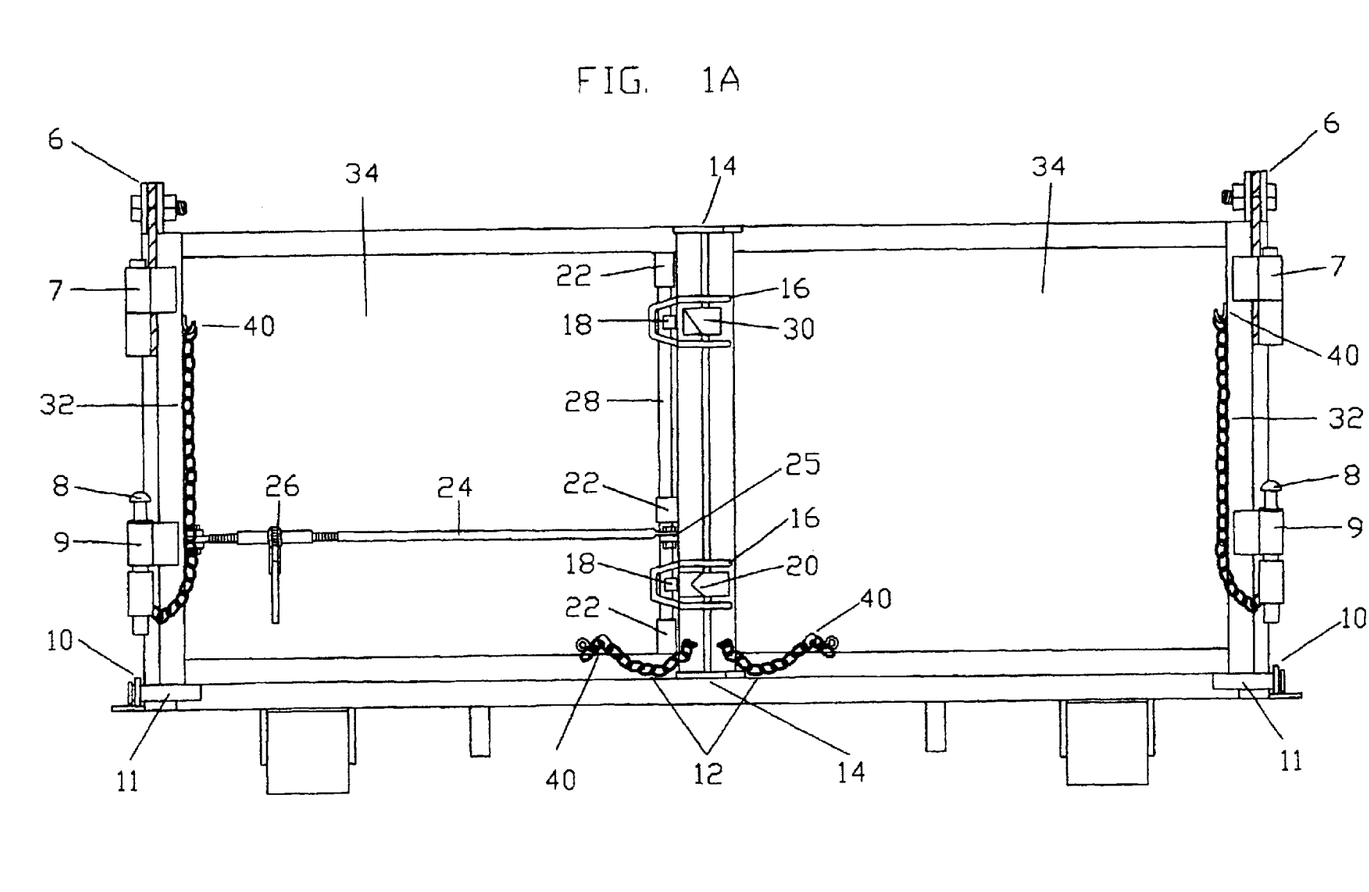
FIGS. 1A and 1B show front views of the tailgate apparatus and its general construct.
Figure 1B:
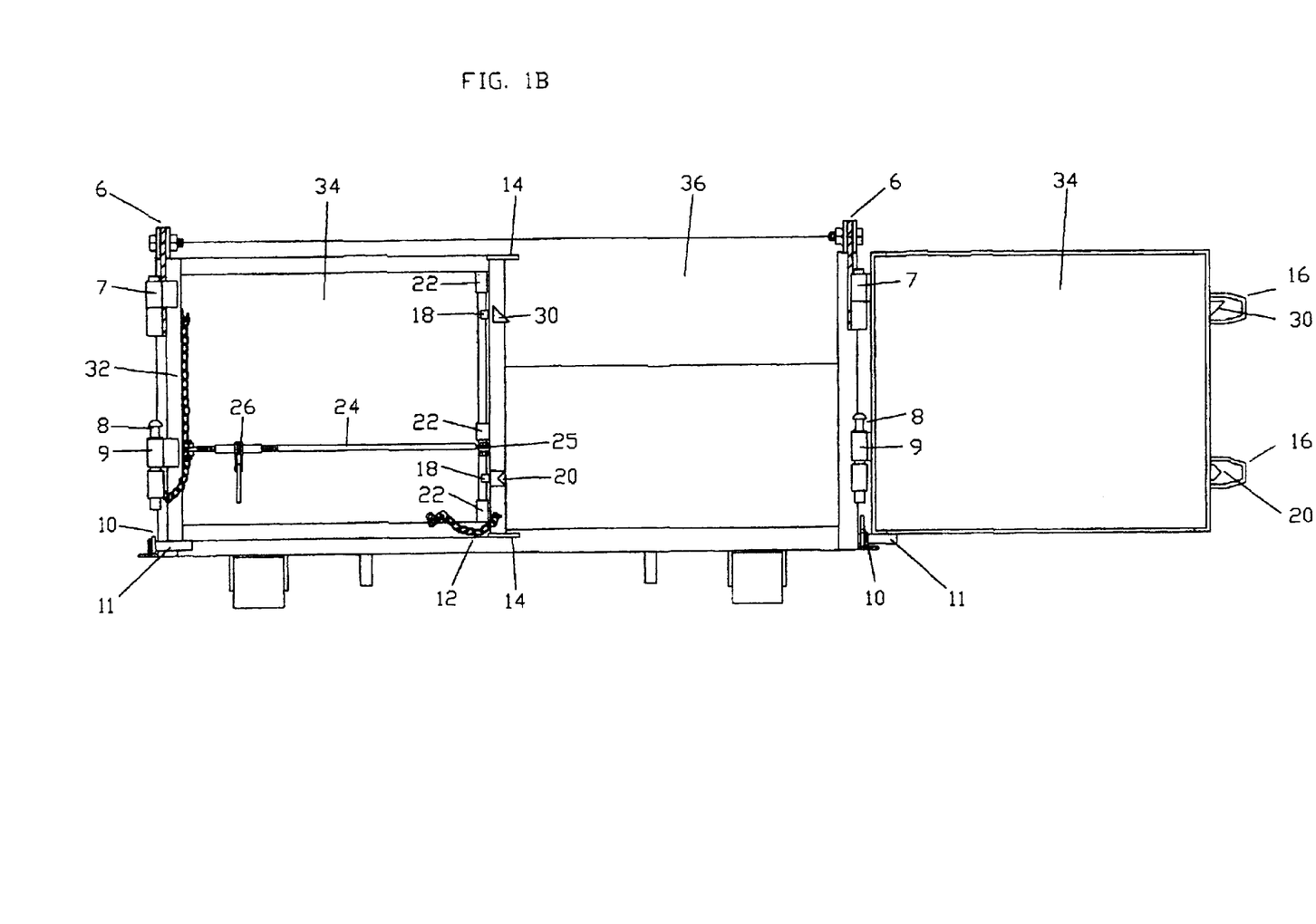

FIGS. 1A and 1B show a front view of the tailgate apparatus as it would appear if used in a split-door style application; the tailgate apparatus is attached to a vehicle body having a cargo bed. There are two door panels 34 that are each connected to respective dump-swing hinge brackets 6; these swing hinge brackets 6 also connect the tailgate to the vehicle body allowing the tailgate to move pivotably about a horizontal axis at the top. Each door panel 34 has an upper door hinge 7 and a lower door hinge 9 that is attached to the door panel 34. The upper door hinge 7 is attached to the door panel 34, but not to the vehicle body itself. The top piece of the lower door hinge 9 is attached to the door panel 34, but the bottom piece of lower door hinge 9 is attached to the vehicle body. These hinges (7 and 9) permit the door panels 34 to rotate about a vertical axis at one or both ends of the tailgate apparatus. A door chain 32 is connected to the door and can be attached to the chain fastener 40 while not in use. The dump latch bar 11 is attached at the bottom of the door panel 34; the dump latch 10 can be engaged or disengaged from the dump latch bar 11 so that the door panel 34 is secured or unsecured to the vehicle body at the bottom. While the dump latch 10 is disengaged from the dump latch bar 11, the door panels 34 can pivot about the horizontal axis at the top of the tailgate. The safety chains 12 on the door panels 34 are fastened to chain fasteners 40 on the door panel to allow them to be crossed or uncrossed as needed during operation or in transit.

Two latch loops 16 are attached to the right door panel 34; the positioning bracket 30 and positioning fork 20 are also attached to the right door panel. The positioning bracket 30 and positioning fork 20 have corresponding parts on the opposing door panel 34 that provide a tight, angular fit when the latch loops 16 are in a closed position.

The pivot bar 28 is attached to three bushings 22 that are connected to the left door panel 34; the pivot bar 28 is also connected to two cam locks 18 that may engage and disengage with the latch loops 16. The pivot bar 28 is connected to the cam actuator 25, which is in turn connected to the extension bar 24. The extension bar 24 is connected to the ratchet binder 26, and the extension bar 24 is attached to the door panel 34 along the left edge opposite the pivot bar 28.

The construct of the left door panel 34 along its edge mirrors that of the right door panel 34. It encompasses a dump-swing hinge bracket 6, an upper door hinge 7, a lower door hinge 9, a door hinge pin 8, a door chain 32, a chain fastener 40, a dump latch 10, and a dump latch bar 11.

FIG. 1B shows the same front view of the tailgate apparatus as FIG. 1A, but illustrates the tailgate apparatus in split-door style where one door panel 34 is open. FIG. 1B shows the vehicle bed 36 where the right door panel 34 is open and the latch loops 16 are disengaged from the cam locks 18 so the slit-door panel 34 is in an open position.

Figure 1C:
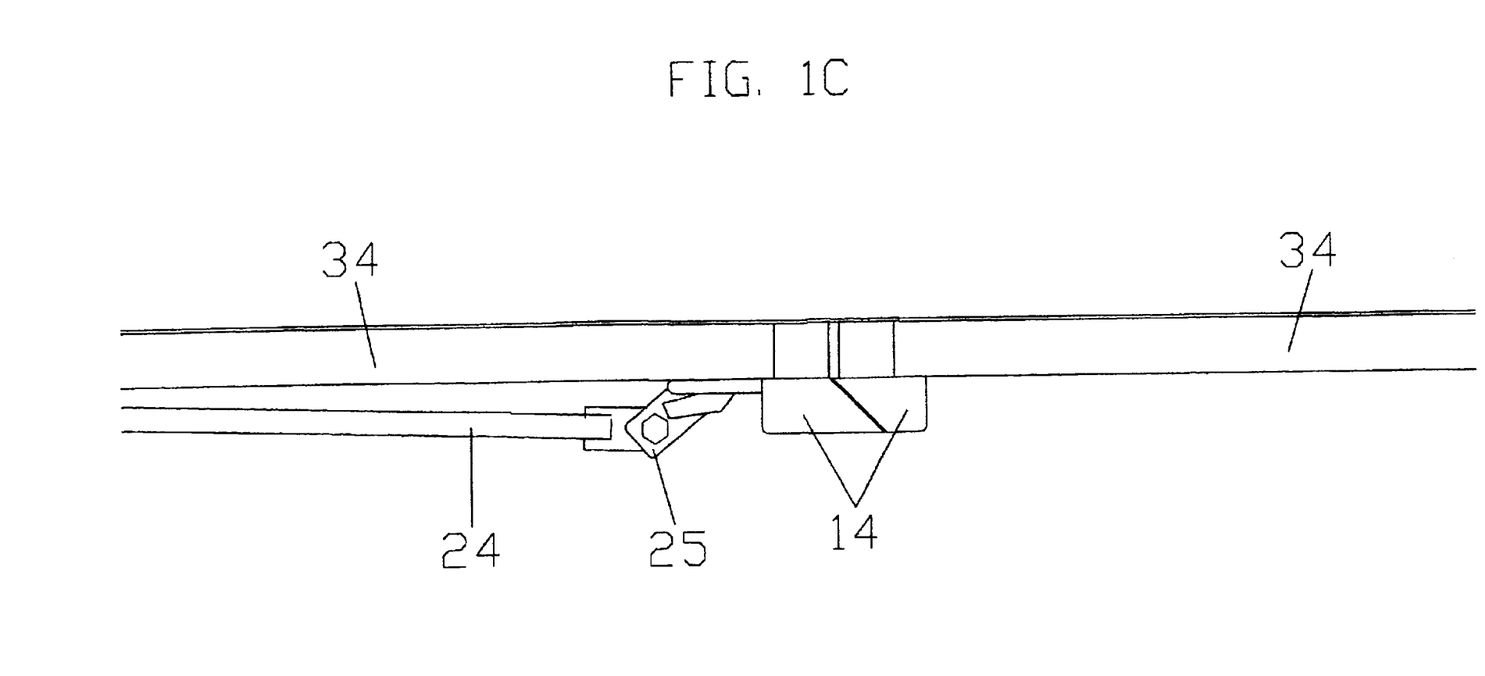
FIG. 1C shows an exploded top view of the tailgate apparatus to show the unique alignment locking feature of the tailgate doors.

FIG. 1C shows a top view of the door panels 34 illustrating a close-up depiction of the alignment locks 14; the alignment lock has a piece attached to each door panel 34 so that when the door panels 34 are in a closed position, the alignment locks form a tight, angular fit. FIG. 1C also shows the top view of the extension bar 24 as it connects to the cam actuator 25.

Figure 1D:
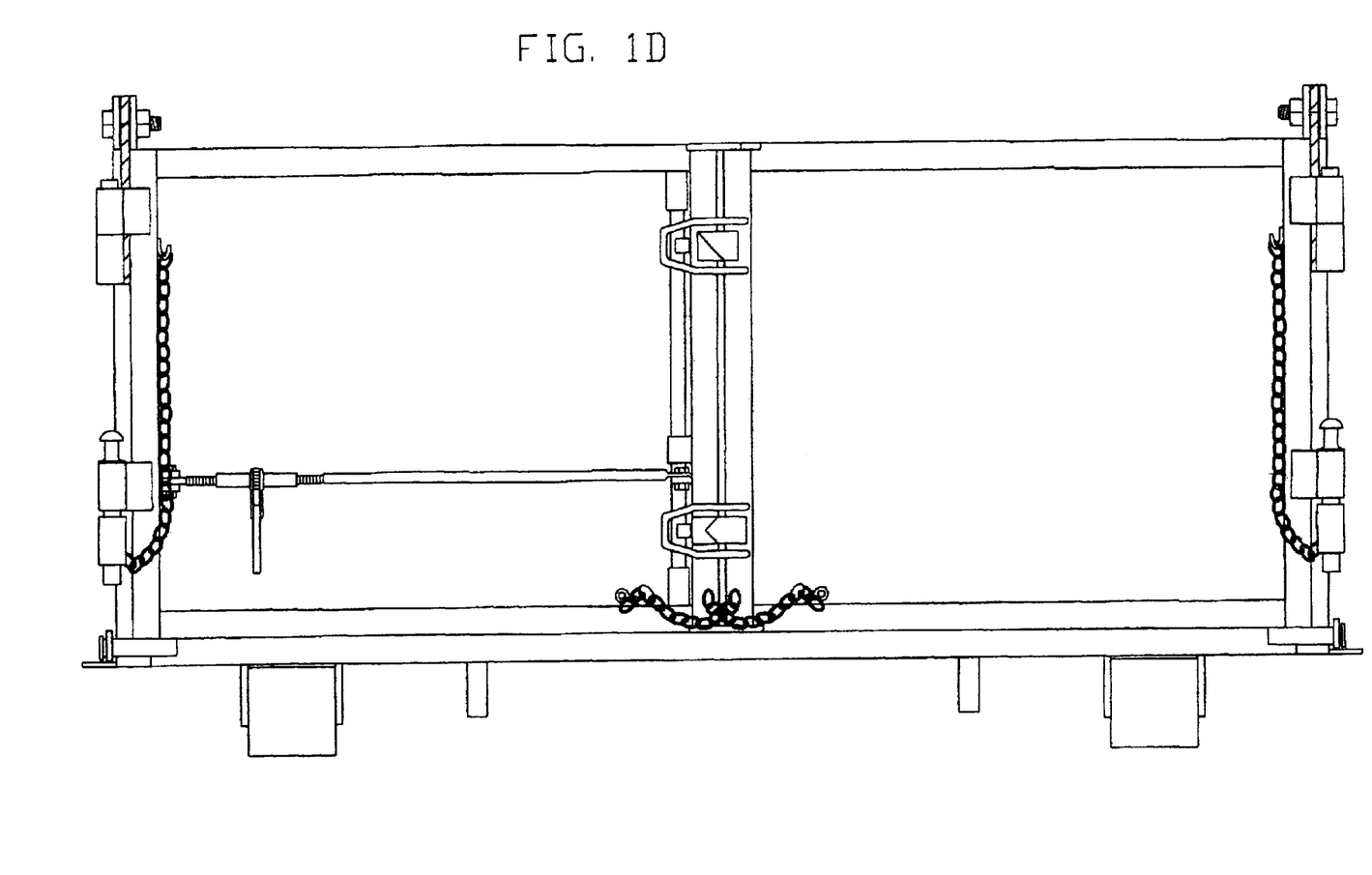
FIG. 1D shows another front view of the tailgate apparatus with the safety chains in a crossed position as they would be when the apparatus was used as a dump-style tailgate or during transit.

FIG. 1D shows the same front view of the tailgate apparatus as shown in FIG. 1A; however, FIG. 1D shows the safety chains 12 in a crossed position where the safety chains 12 are attached to the chain fasteners 40 on the door panel 34. Each safety chain 12 is fastened to the chain fastener 40 on the opposite door panel 34 than that to which the safety chain 12 is attached.

Figure 2A:
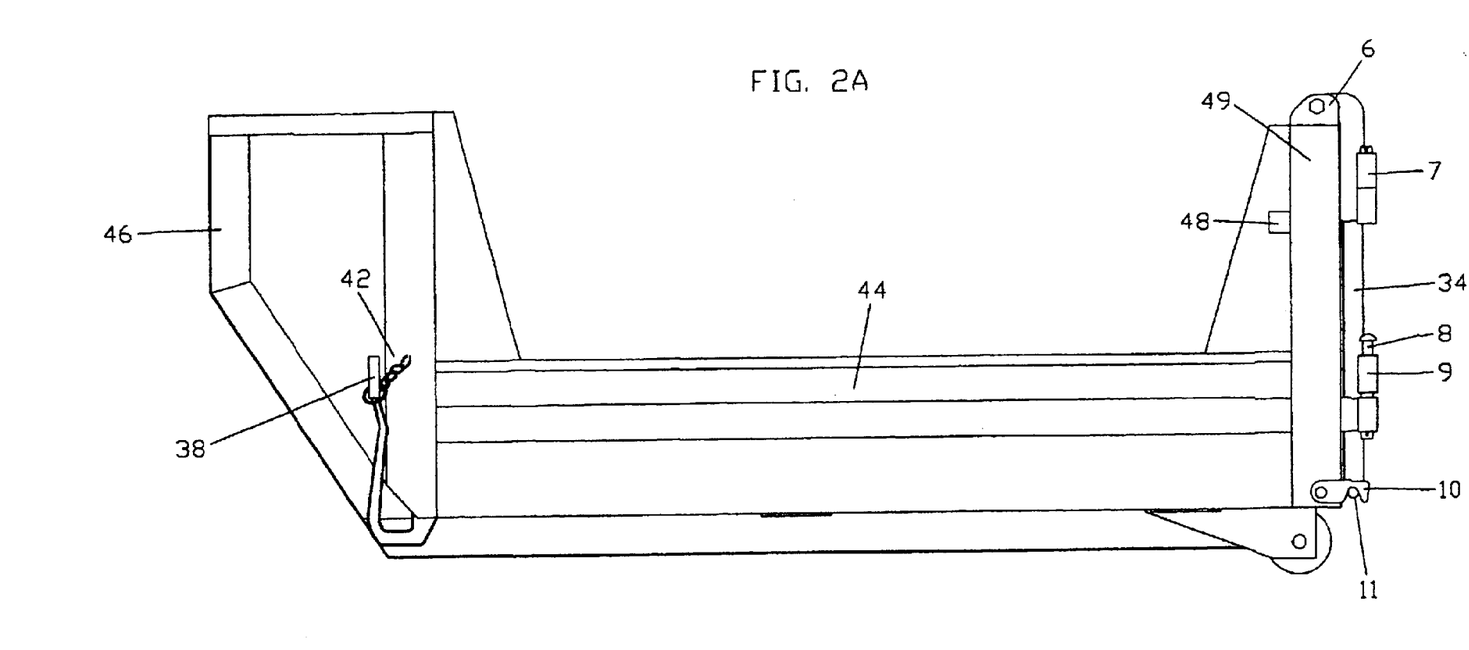
FIGS. 2A to 2C show various aspects of the side view of the vehicle body that provide further indications of how the tailgate apparatus operates as either a dump-style or split-door style tailgate.
Figure 2B:
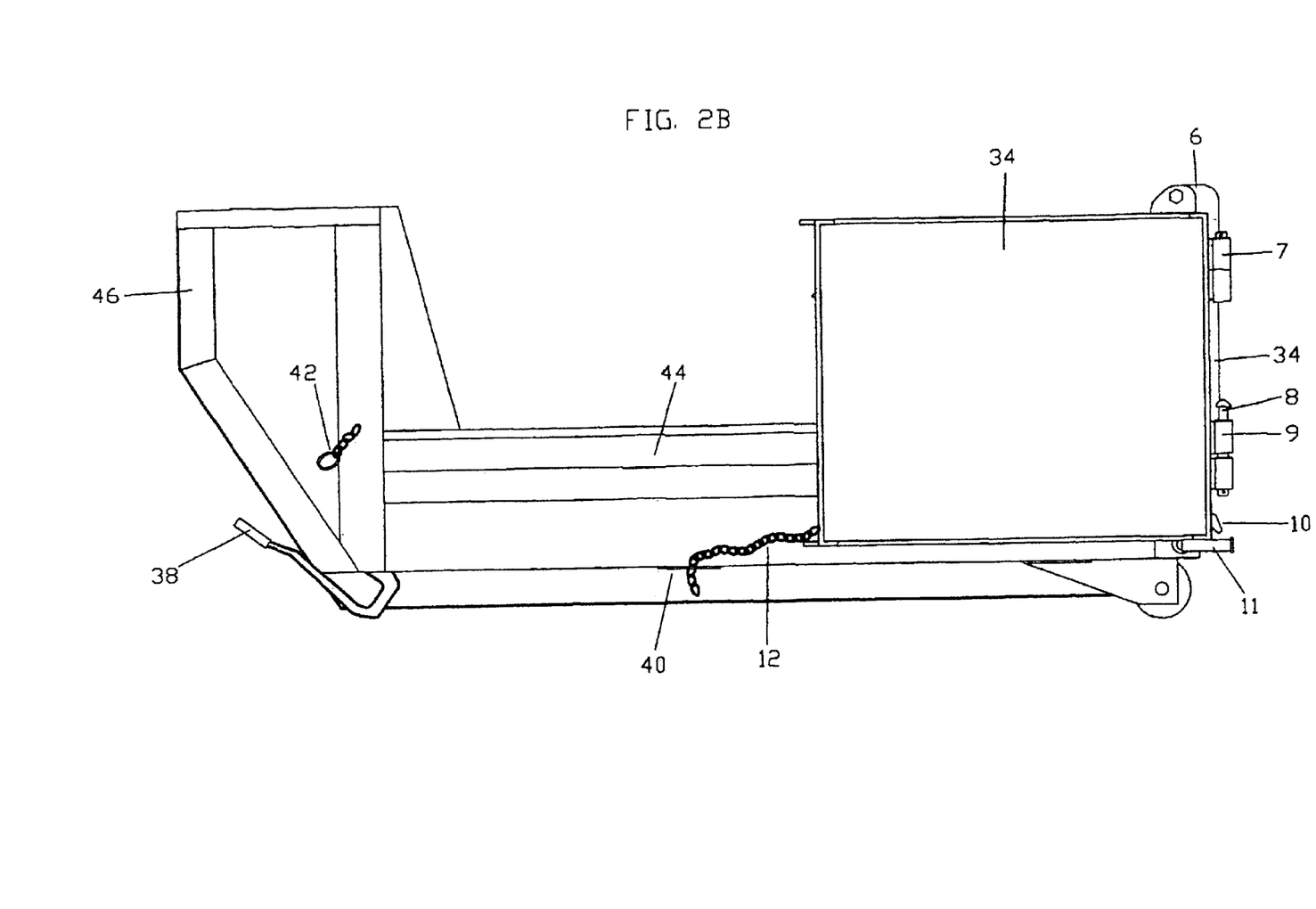
Figure 2C:
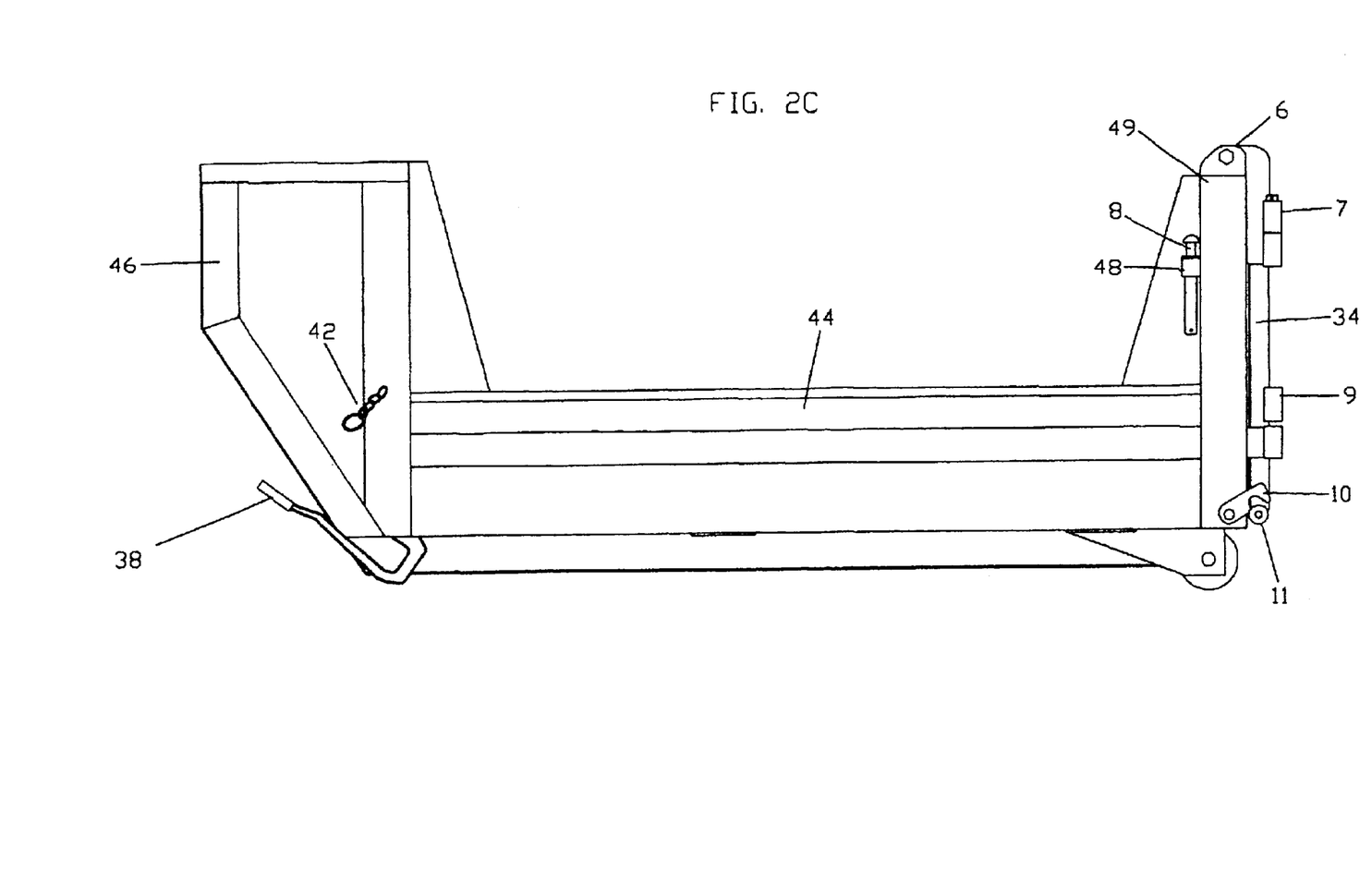

FIGS. 2A to 2C—Additional Embodiments

FIGS. 2A to 2C illustrate various side views of the vehicle body indicating how the tailgate apparatus is used in conjunction with the vehicle body. The door panel 34 of the tailgate apparatus is shown attached to the dump-swing hinge bracket 6, which attaches the door panel 34 to the rear vehicle bed 49. The upper door hinge 7 and the lower door hinge 9 are connected to the door panel 34 as shown in FIG. 1A. The door hinge pin 8 is inserted into the lower door hinge 9. The dump latch bar 11 is engaged with the dump latch 10, shown in the down position. The door hinge pin holder 48 is connected to the rear vehicle bed, which also connects to the vehicle bed side wall 44. The vehicle bed side wall 44 is attached to the front vehicle bed 46. The dump latch release safety chain 42 is also attached to the front vehicle bed 46; it is shown fastened to the dump latch safety release 38, which is connected to the dump latch 10 attached at the rear vehicle bed 49.

FIG. 2B shows the door panel 34 in an open position attached to the vehicle bed side wall 44 by the safety chain 12, which is attached at the chain fastener 40 on the vehicle bed side wall 44. FIG. 2B also shows the dump latch safety release disengaged from the dump latch release safety chain 42. The dump latch safety release 38 is connected to the dump latch 10, which is in an up position and disengaged from the dump latch bar 11.

FIG. 2C illustrates the door panel 34 attached to the rear vehicle bed 49 by the dump-swing hinge bracket 6. The door hinge pin 8 is inserted into the door hinge pin holder 48 so that it is no longer hinging the door panel 34 to the rear vehicle bed 49. The dump latch safety release 38 is disengaged from the dump latch release safety chain 42 so that the dump latch 10 is in an up position and disengaged from the dump latch bar 11 as shown in FIG. 2B.

Operation

The tailgate apparatus has two different modes of operation. First, it can be used as a dump-style tailgate in which the door panels 34 pivot about a horizontal axis at the top of the tailgate where the door panels 34 are connected to the dump-swing hinge brackets 6. When used as a dump-style tailgate, the door hinge pins 8 must be placed in the door hinge pin holder 48 as shown in FIG. 2C. The door hinge pin 8 is used to connect the door panels 34 and the rear vehicle bed 49 where it is inserted in the lower door hinge 9 because the top part of the lower door hinge 9 is connected to the door panel 34, whereas the bottom part of the lower door hinge 9 is connected to the rear vehicle bed 49. When the door hinge pin 8 is removed from the lower door hinge 9 and placed in the door hinge pin holder 48, the tailgate can swing about the horizontal axis at the top where the door panels 34 are connected to the dump-swing hinge bracket 6. In addition, the dump latch 10 must be disengaged from the dump latch bar 11 by using the dump latch safety release 38 as shown in FIG. 2C. The result is that the bottom of the door panels 34 are no longer attached to the rear vehicle bed 49 since the dump latch 10 is disengaged from the dump latch bar 11.

When using the tailgate apparatus as a dump-style tailgate, the alignment locks 14 (shown in FIGS. 1A–1C), the positioning fork 20, and the positioning bracket 30 provide several different points where the door panels 34 fit together at various angles. This angular construction creates a rigid and tight fit between the door panels 34 that prevents them from buckling or collapsing while they are used as one door piece in a dump-style application. Additionally, the structure is maintained where the ratchet binder 26 can move the extension bar 24 so as to tighten the latch loops 16 around the cam locks 18 creating a tighter fit where the door panels 34 meet. The safety chains 12 may also be crossed while the door is in operation or in transit as a further precaution by fastening each chain to the chain fastener 40 attached to the opposite door panel 34 to prevent the doors from opening prematurely or from buckling.

Second, the tailgate apparatus can be used in split-door applications where access is need to the vehicle bed, or where the cargo load must be loaded or unloaded in a narrow or confined space. In such applications, the tailgate would appear as in FIG. 1A with the door hinge pins 8 inserted into the lower door hinges 9, so that the door panels 34 are connected to the rear vehicle bed 49. Again, the dump latches 10 would need to be disengaged from the dump latch bars 11 by using the dump latch safety release 38 as shown in FIGS. 2B and 2C; this allows the split door panels 34 to rotate freely about vertical axes along each side of the tailgate.

The split door panels 34 may be opened by ratcheting the ratchet binder 26 that in turn shortens or elongates the extension bar 24. The extension bar 24 then moves cam actuator 25 causing the pivot bar 28 to move in a circular manner. The cam locks 18 are attached to the pivot bar 28; as the pivot bar 28 moves, the cam locks 18 are disengaged from the latch loops 16. When the latch loops 16 have been disengaged from the cam locks 18, the split door panels 34 can be fully opened as shown in FIG. 1B. It is important to note that the off-center placement of the ratchet binder 26 protects the operator from injury upon opening the split door panels 34 because. If material in the vehicle bed shifted during transport, it could fall out unexpectedly when the door panels 34 were opened. If the operator were standing directly in front of the doors, he and other bystanders could suffer serious injuries. Since the ratchet binder 26 is placed off-center, it provides further safety precautions from such a result. FIG. 2B also shows how the split door panels 34, once opened, can be attached to the vehicle bed side wall 44 by connecting the safety chain 12 to the chain fastener 40 that is affixed to the vehicle bed side wall 44.

Conclusions, Ramifications, and Scope

Thus, the tailgate apparatus of this invention provides a device that can be simply operated and permits use between both dump-style and split-door style tailgate applications. The angular construction of the door panels creates a more reliable tailgate apparatus where the structure is more rigid and the split panels are more tightly fitted so that the doors do not buckle or collapse during operation of the tailgate. While my above description contains many specificities, these should not be construed as limitations on the scope of the invention, but rather as an exemplification of one preferred embodiment thereof. Many other variations are possible. One example would be where the apparatus was used both as a dump-style tailgate and as a single door tailgate that rotates about a vertical axis at one end of the tailgate instead of both ends as described above. Accordingly, the scope of the invention should be determined not by the embodiment(s) illustrated, but by the appended claims and their legal equivalents.

We claim:

1. A split-door tailgate pivotal about mutually perpendicular vertical and horizontal axes for use with a dump vehicle having a tiltable cargo bed for holding material therein, the cargo bed having a front wall, and a pair of opposed sidewalls defining a rear opening for discharging material from the cargo bed, the split-door tailgate comprising:

a first door panel and a second door panel with each door panel pivotally mounted to one respective sidewall so that the door panels can be brought together to close the rear opening and selectively and independently opened to allow the discharge of material from the cargo bed;

a pivot bar vertically mounted on the first door panel for selective rotational motion thereon;

a pair of cam locks mounted to the pivot bar and rotating concomitant with the rotation of the pivot bar;

a pair of latch loops mounted on the second door panel for engagement to the cam locks so that the door panels can be locked together and disengagement from the cam locks so that the door panels can be opened;

a cam actuator mounted on the pivot bar;

an extension bar having a first end joined to the cam actuator and a second end;

a ratchet binder mounted to the second end of the extension bar and manually reciprocable thereon so that the reciprocable motion of the ratchet binder in one direction causes the rotation of the extension bar resulting in the rotation of the cam actuator and the pivot bar thereby tightening of the latch loops on the cam locks for locking the door panels together while the reciprocable motion of the ratchet binder in a second direction causes the opposite rotation of the extension bar resulting in the opposite rotation of the cam actuator and the pivot bar thereby loosening the latch loops on the cam locks for unlocking the door panels from each other; and a pair of beveled alignment locks with each alignment lock mounted to the upper portions of the first and second door panels so that the alignment locks can be brought into a tight abutting relationship when the door panels are closed thereby maintaining tight closure of the door panels when the cargo bed is tilted for dumping.

2. The split door tailgate of claim 1, further comprising a pair of angular positioning forks with each fork mounted to the lower portion of each respective door panel so that the positioning forks can be brought into a tight, interfitting relationship when the door panels are closed thereby maintaining tight closure of the door panels when the cargo bed is tilted for dumping.

3. The split door tailgate of claim 1, further comprising a pair of latch bars with each latch bar secured to the lower portion of each door panel.

4. The split door tailgate of claim 3, further comprising a pair of dump latches for engagement to the latch bars in order to prevent the door panels from pivoting on their respective horizontal axes and disengagement therefrom to allow the door panels to pivot on their respective horizontal axes.

5. The split door tailgate of claim 4, further comprising at least one manually operable dump latch safety release mounted adjacent the front wall of the cargo bed for interconnection to the dump latches so that manually depressing the dump latch safety release causes the dump latches to disengage from the latch bars thereby allowing both door panels to pivot about their horizontal axes.

6. The split door tailgate of claim 5, further comprising a pair of dump swing hinge brackets with each dump swing hinge bracket mounted to the upper portion of each respective door panel with the first door panel pivotally secured to one dump swing hinge bracket along a horizontal axis and the second door panel pivotally secured to the other dump swing hinge bracket along a horizontal axis so that each door panel can selectively pivot about its horizontal axis independent of the other door panel.

7. The split door tailgate of claim 6, wherein both door panels can pivot in unison about their respective horizontal axes and on their respective dump swing hinge brackets for opening the rear opening and allowing the dumping of material from the cargo bed when the cargo bed is upwardly tilted from the dump vehicle.

* * * * *